United States Patent
Chang (10) Patent No.: US 7,020,144 B2
(45) Date of Patent: Mar. 28, 2006

(54) HIGH CAPACITY MULTI-AAL SYSTEM FOR VTOA GATEWAY

(75) Inventor: Leon F. Chang, Gahanna, OH (US)

(73) Assignee: Lucent Technologies Inc., Murray Hill, NJ (US)

(*) Notice: Subject to any disclaimer, the term of this patent is extended or adjusted under 35 U.S.C. 154(b) by 984 days.

(21) Appl. No.: 09/825,397

(22) Filed: Apr. 3, 2001

(65) Prior Publication Data

US 2002/0141395 A1   Oct. 3, 2002

(51) Int. Cl.
*H04L 16/66* (2006.01)
*H04L 12/28* (2006.01)

(52) U.S. Cl. .............. 370/395.6; 370/352; 370/395.21; 370/401

(58) Field of Classification Search ........... 370/400, 370/389, 314, 356, 401, 395.5, 395.53, 395.6, 370/395.61
See application file for complete search history.

(56) References Cited

U.S. PATENT DOCUMENTS

| | | | |
|---|---|---|---|
| 6,266,343 B1 * | 7/2001 | Caves | 370/466 |
| 6,407,992 B1 * | 6/2002 | Pasternak et al. | 370/338 |
| 6,728,249 B1 * | 4/2004 | Chang | 370/395.3 |
| 6,765,912 B1 * | 7/2004 | Vuong | 370/395.2 |
| 6,832,254 B1 * | 12/2004 | Scoggins et al. | 709/227 |

* cited by examiner

*Primary Examiner*—Hanh Nguyen (57) ABSTRACT

A Packet Voice Gateway (PVG) system and related method are disclosed wherein a single ATM circuit emulation board performs conversion of Asynchronous Transfer Mode (ATM) formatted cells received from an ATM packet network to a Time Division Multiplexed (TDM) format for delivery to a circuit switched network, including AAL 1/2 bearer cells, AAL 3/4 data cells, AAL5 signaling cells, and raw AAL0 cells. In particular, as ATM cells are received from the ATM packet network, their cell headers are translated according to a predetermined translation scheme. The ATM cells are then processed according to their translated cell headers, which allows the cells to be handled according to their payload type.

25 Claims, 7 Drawing Sheets

| HEADER FIELD | GFC 4-BIT | | VPI 8-BIT | | VCI 16-BIT | | | PTI 3-BIT | | CLP | MUX1 | OAM | MUX2 | SAR |
|---|---|---|---|---|---|---|---|---|---|---|---|---|---|---|
| BIT FIELD POSITION | 3-2 (A) | 1-0 | 7-3 | 2-0 (C) | 15-9 | 8 (D) | 7-0 | 2 (B) | 1-0 | | KEY ON GFC[3-2] | KEY ON PTI[2] | KEY ON VPI[2-0] | KEY ON VCI[8] |
| AAL1 USER CELLS | 0 | X | X | ANY | X | 1 | ANY | 0 | 1 | 0 | 1-TO-4 DEMUX TO OAM | USER CELLS 0 PASS-THROUGH | 1-TO-8 DEMUX | 256 DS0 CHANNELS |
| SEG/END F5 OAM CELLS | 0 | X | X | =USER | X | 1 | SAME AS =USER | 1 | X | X | SAME AS ABOVE | OAM F5 CELLS ARE TERMINATED | N/A | N/A |
| SEG/END F4 OAM CELLS | 0 | X | ANY | ANY | X | 0 | SEG=3, END-TO-END=4 | 1 | X | X | SAME AS ABOVE | OAM VCI=3 OR 4 ARE TERMINATED | N/A | N/A |
| SIGNALING HAIRPIN | 0 | X | ANY | ANY | 0 | 0 | ANY | 0 | X | X | SAME AS ABOVE | PASS THROUGH | 1-TO-8 DEMUX | OAM QUEUE |
| UNHANDLED F5 OAM CELLS | 0 | X | X | =USER | X | 1 | SAME AS =USER | 0 | X | X | SAME AS ABOVE | PASS THROUGH | 1-TO-8 DEMUX | OAM QUEUE |
| UNHANDLED F4 OAM CELLS | 0 | X | ANY | ANY | X | 0 | SEG=3, END-TO-END=4 | 0 | X | X | SAME AS ABOVE | PASS THROUGH | 1-TO-8 DEMUX | OAM QUEUE |
| AAL5 DATA CELLS | 1 | ANY | ANY | ANY | ANY | A | ANY | 1 | X | X | 1-TO-4 DEMUX TO SIGNALING SAR | N/A | N/A | N/A |
| AAL5 F5 OAM CELLS | 1 | ANY | ANY | SAME AS AAL5 DATA CELLS | | | | ANY | X | X | SAME AS ABOVE | N/A | N/A | N/A |
| AAL5 F4 OAM CELLS | 1 | ANY | ANY | ANY | ANY | 0 | SEG=3, END-TO-END=4 | X | X | X | SAME AS ABOVE | N/A | N/A | N/A |

HIGH CAPACITY MULTI-AAL SYSTEM FOR VTOA GATEWAY

BACKGROUND OF THE INVENTION

1. Field of the Invention

This invention relates to telecommunication systems in which voice and telephony traffic are carried over a data network. More particularly, the invention concerns an improvement in VTOA (Voice and Telephony Over ATM) gateways.

2. Description of the Prior Art

The infrastructure and technology of the current Public Switched Telephone Network (PSTN) is evolving from a wholly circuit switched model to a model that includes packet-based networking, particularly for trunking between End Office (EO) switches. The use of flexible and cost-effective packet-based networks allows for the convergence of voice and data while maintaining the convenience, reliability and quality-of-service of circuit-switching. ATM (Asynchronous Transfer Mode) networks are currently the preferred choice for building packet-telephony systems because of their high bandwidth, efficiency and Qos (Quality of service).

A VTOA Packet Voice Gateway (PVG) is a gateway system that interconnects circuit switched network components, such as End Offices, to an ATM core network. The PVG has a TDM interface connected to the circuit switched network, an ATM interface connected to the ATM network, and an interworking system for converting between the TDM and ATM protocol formats. The interworking system typically comprises one or more processor controlled circuit boards that manage the conversion between AAL (ATM Adaptation Layer) 1/2 bearer traffic (voice) and AAL 3/4/5 data traffic on the ATM network side, and TDM bearer/data traffic on the circuit-switched network side. Signaling is typically handled by a Control Gateway (CG) that interworks between the narrowband signaling of the circuit-switched network (e.g., ISDN, QSIG, A/B) and the AAL5 UNI broadband signaling used in the ATM network. The CG may either reside on a separate host from the PVG, or on the same host, in which case the PVG circuit board(s) will typically connect to the CG circuit board via a common backplane bus, (e.g., VMEbus, CompactPCI, FutureBus, to name a few). The PVG (also known as a media gateway) and the CG communicate with each other using a standard media gateway control protocol such as Megaco (Media gateway control protocol or H.248) and IPDC (IP Device Control).

Separate processing of different AAL layers by independent circuit boards controlled by localized software is not particularly efficient, even when the PVG and CG circuit boards are resident on the same hardware platform. It would be desirable to simplify such processing using an integrated approach, preferably allowing all AAL layers to be processed through a single circuit board controlled by single set of integrated software routines.

SUMMARY OF THE INVENTION

The foregoing problems are solved and an advance in the art is obtained by a novel Packet Voice Gateway (PVG) system and related method wherein a single ATM circuit emulation board performs conversion of Asynchronous Transfer Mode (ATM) formatted cells received from an ATM packet network to a Time Division Multiplexed (TDM) format for delivery to a circuit switched network, including AAL 1/2 bearer cells, AAL 3/4 data cells, AAL5 signaling cells and raw AAL0 cells. In particular, as ATM cells are received from the ATM packet network, their cell headers are translated according to a predetermined translation scheme. The ATM cells are then processed according to their translated cell headers, which allows the cells to be handled according to their payload type.

In preferred embodiments of the invention, the ATM cells are received at an optical fiber interface (optical transceiver) as a SONET (Synchronous Optical NETwork) OC-3c (Optical Carrier-3c) (155 Mbps) data stream or the like. After conventional clock recovery, the usual physical layer deframing is performed at a framer/deframer. The ATM cells are then forwarded to a cell header translator/cell router for cell header translation and cell routing. Cell header translation includes mapping untranslated cell headers of the incoming ATM cell stream to translated cell headers. This mapping is performed by a conventional Content Addressable Memory CAM that is provisioned with Per Call Control (PCC) ATM channel information by the circuit emulation board's host processor as ATM channels are assigned during call setup. Using techniques employed by ATM switches for rapid VPI/VCI cell header translation of ATM cells forwarded from one VC segment to another in a VCC, each provisioned ATM channel is assigned an address value. When an incoming ATM cell is received at the cell header translator/cell router, a CAM lookup is performed to match the untranslated cell header with one of the provisioned ATM channels. When the matching channel entry is found in the CAM, the address value of the matched channel is used to perform a lookup in a Random Access Memory (RAM) lookup table containing translated cell headers and which is indexed by the address values identified in the CAM. A translated cell header is identified and applied to the ATM cell. The cell header-translated ATM cell is then forwarded for cell processing.

In preferred embodiments of the invention, cell processing involves the use of plural cell processing devices to perform different cell processing according to the translated cell headers. Cell processing may thus include processing handled Operations And Maintenance (OAM) cells at an OAM processor according to a first cell processing strategy based on first translated cell header values. The handled OAM cells include F4 (VP level cell flow) and F5 (VC level cell flow) loopback (segment/end-to-end) OAM cells and other well-known OAM cell types.

Cell processing may further include directing unhandled Operations And Maintenance (OAM) cells to a host processor according to a second cell processing strategy based on second translated cell header values. The unhandled OAM ATM cells include unhandled F4 and F5 OAM cells and other well-known OAM cell types. The unhandled OAM cells may also include signaling cells received on a hairpinning channel from a Control Gateway via the ATM network.

Cell processing may further include processing bearer and data traffic cells at a multiplexer/demultiplexer adapted to process AAL 1/2 and AAL 3/4 ATM cells and to route said cells to output ports according to a third cell processing strategy based on third translated cell header values.

Cell processing may further include processing the bearer and data traffic cells at plural Segmentation And Reasssembly (SAR) processors, each SAR processor being adapted to receive AAL 1/2 and AAL 3/4 ATM cells received from one of said multiplexer/demultiplexer output ports, to reassemble said cells into a format suitable for Time Division Multiplexing (TDM) transmission, and to route said reassembled cells to output ports according to a fourth cell processing strategy based on fourth translated cell header values.

Cell processing may further include processing signaling cells at a signaling SAR processor according to a fifth cell processing strategy based on fifth translated cell header values. In this embodiment, the circuit emulation board further includes a second multiplexer/demultiplexer located between the cell header translator/cell router and the OAM processor. The second multiplexer/demultiplexer is adapted to process AAL 5 cells having the fifth translated cell header values and route them to the signaling SAR processor for reassembly and forwarding to an AAL 5 signaling stack.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
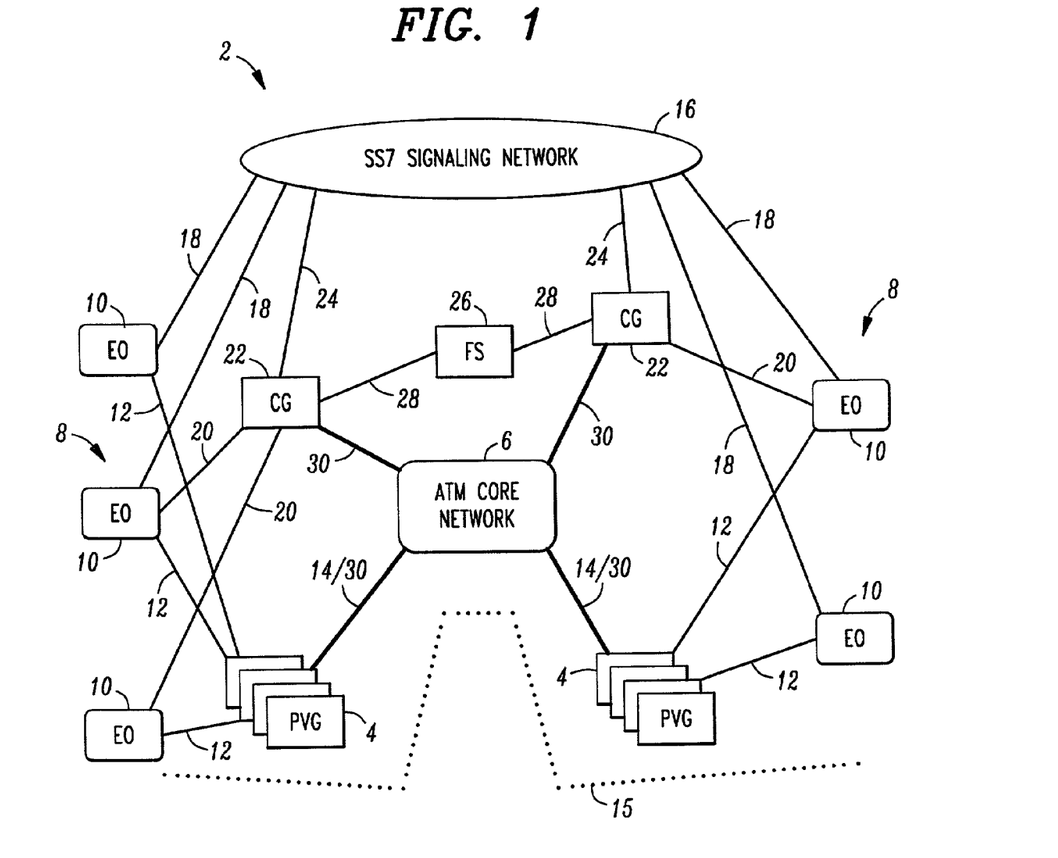
FIG. 1 is a functional block diagram showing network architecture for a telecommunication system that provides VTOA support.

Turning now to the figures, wherein like reference numerals represent like elements in all of the several views, FIG. 1 illustrates a network architecture for a telecommunication system 2 that provides VTOA support in accordance with the invention. The system 2 includes plural Packet Voice Gateways (PVG)s 4 that provide bearer and data traffic interconnections between an ATM core network 6 and circuit switched networks 8. The circuit switched networks 8 comprise conventional circuit switched network switching entities 10, which are shown as being End Offices (EO)s that would each typically support a base of local loop subscribers (not shown) and other telephone/data customers, such as PBX, dial-up modem and fax.

The light dashed lines 12 extending between the EOs 10 and the PVGs 4 in FIG. 1 represent pathways that carry voice and/or data traffic in TDM digital format. The PVG's convert the information contained in this traffic to ATM AAL1/2 and/or AAL 3/4 cell format and establish Switched Virtual Circuit (SVC) connections 14 for transport of the information across the ATM core network 6. An overall bearer pathway for voice/data traffic exchanged between two EOs 10 is shown by the heavy dashed line labeled 15 in FIG. 1.

Signaling is handled in the telecommunication system 2 by a conventional SS7 (Signaling System 7) signaling network, shown generally as a network cloud at 16, and by the ATM core network 6. As is known, an SS7 signaling network includes signaling points known as SSPs (Service Switching Points), STPs (Signaling Transfer Points) and SCPs (Service Control Points). Each SS7 signaling point has a unique PC (Point Code) for routing signaling messages. In FIG. 1, the EOs 10 represent SSPs and the STPs and SCPs are assumed to reside in the SS7 signaling network cloud represented by reference numeral 16. Each of the foregoing SS7 signaling points communicates with other SS7 signaling points via interconnecting signaling links. These signaling links can be DS0, T1 and ATM (T1 and ATM links are considered high speed links compared to traditional 56 Kbps/64 Kbps DS0 links).

In FIG. 1, the SS7 signaling links are shown by the solid line pathways 18, 20, and 24. The pathways 18 are SS7 "A-links" (Access-links) that extend between the some of the EOs 10 and STPs located within the SS7 network cloud 16. Among other things, these SS7 A-links carry SS7-ISUP messages for TDM DS0 bearer channel CIC setup between the EOs 10 and the PVGs 12. The solid line pathways 20 are SS7 "F-links" (Fully associated links) that connect some of the EOs 10 to Control Gateways (CG) 22. The CGs 22 control the PVGs 4 to establish the aforementioned SVCs using a conventional media gateway control protocol such as Megaco or IPDC. As is conventionally known, SS7 F-links are used to directly connect two SSPs, such as two EOs, while bypassing the STPs. Thus, from an SS7 signaling point of view, the CGs are another SSP in the signaling network having a unique PC.

The CGs 22 also perform signaling interworking between the narrowband signaling format(s) used by the circuit-switched networks 8, and the broadband UNI signaling used in the ATM core network 6. The signaling pathways 24 represent SS7 A-links that interconnect the CGs 22 and STPs in the SS7 network cloud 16. The CGs are also connected to a Feature Server (FS) 26 via pathways 28. The FS is used for routing, call control, billing and other conventional services, as is well known in the art.

In FIG. 1, the CGs 22 are shown as being remotely located from the PVGs 4, and to communicate therewith through pathways 30 extending between the CGs and the ATM core network 6 (for simplicity, the second leg of each pathway 30 is shown as being physically co-located with the media carrying the SVC connections 14). The pathways 30 carry UNI signaling messages and IPDC/Megaco messages using an arrangement known as "hairpinning." This is a tunneling arrangement wherein call signaling relative to calls handled by the PVGs are tunneled in a Permanent Virtual Circuit (PVC) extending between each CG 22 and its associated traffic-carrying PVG 4. The hairpinning PVC has a VPI/VCI pair designation other than the VPI=0:VCI=5 channel reserved for UNI signaling. When the tunneled signaling messages arrive at the PVG 4, they are placed in the same OC-3c pipe as the bearer traffic using a translated VPI/VCI header for transmission across the ATM core network 6. The principal motivation for hairpinning is that the UNI 3.1 signaling protocol, which is used in many ATM switches, requires that AAL5 signaling traffic be sent over the same pipe as the AAL1 bearer traffic it controls. Note that in alternative configurations of the telecommunication network 2, the CGs 22 could be co-located with the PVGs 4 on a single hardware platform, in which case hairpinning would not be required.

Figure 2:
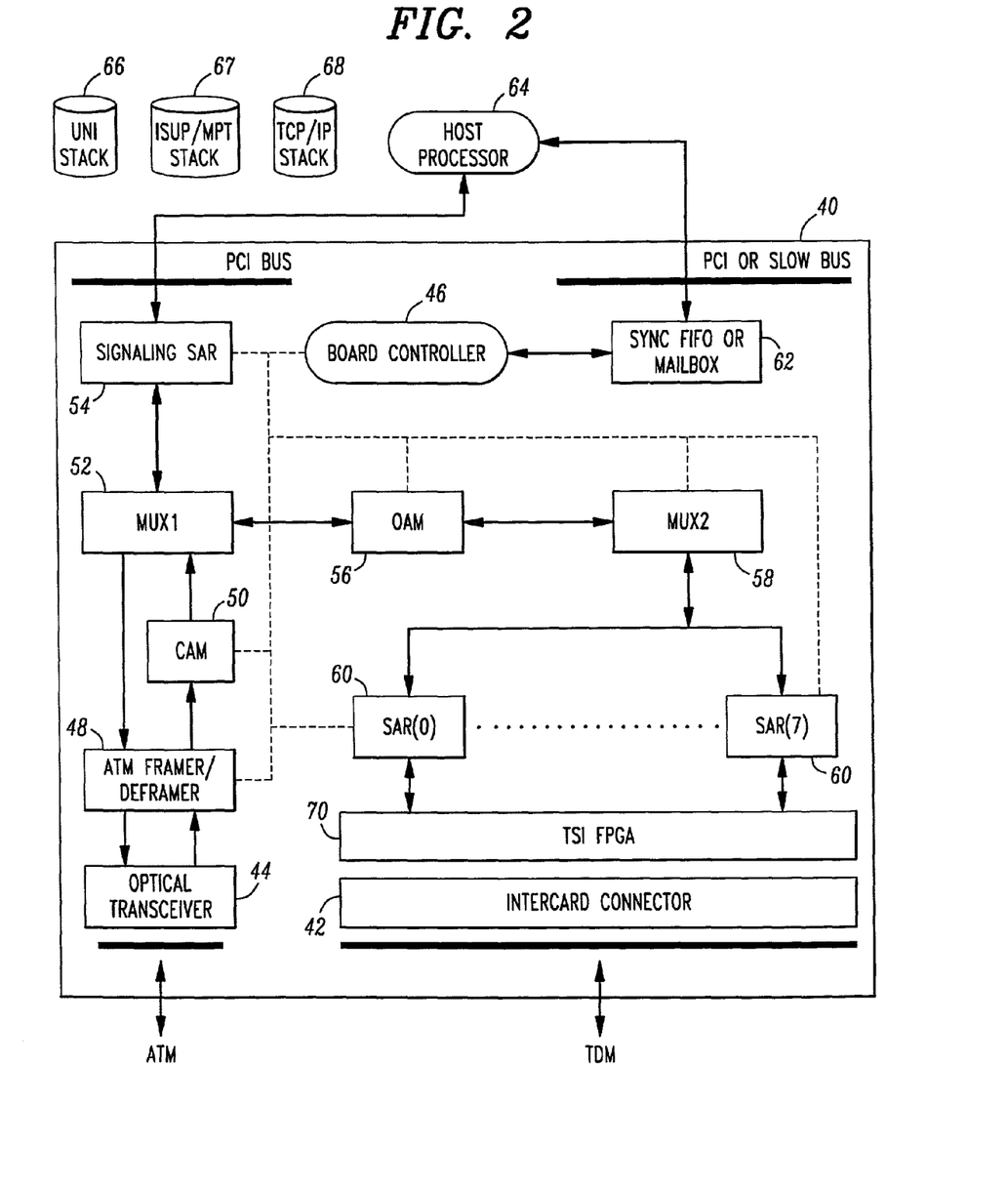
FIG. 2 is a functional block diagram showing an ATM circuit emulation board constructed in accordance with the invention.

Turning now to FIG. 2, each PVG system 4 implements one or more ATM circuit emulation boards 40 that convert the TDM traffic to ATM traffic and vice versa. For voice and data, each 64 Kbps traffic TDM Virtual Channel (VC) is mapped to either a full duplex ATM channel or two simplex ATM channels over which AAL1/2 cells (voice) and AAL 3/4 cells (data) are carried. By way of example only, the circuit emulation board 40 terminates one OC-3 signal (or 3 STS-1E signals) capable of carrying 2016 DS0 VCs at its TDM side, and one OC-3c signal (or 3 STS-1E signals) capable of carrying 2016 ATM VCs at its ATM side. The TDM signals are carried to and from the circuit emulation board 40 on a TDM bus to which the circuit emulation board is mounted using a conventional intercard bus connector 42. The ATM signals are carried to and from the circuit emulation board 40 on an ATM link to which the circuit emulation board is connected via a conventional optical transceiver 44.

A board controller 46 manages call setup and traffic handling operations of the circuit emulation board 40. It includes a microprocessor that runs a conventional real-time operating system kernel and a device driver that controls the circuit emulation board's various hardware devices. These include an ATM framer/deframer 48, a CAM/RAM 50, a first multiplexer (MUX1) 52, a signaling SAR 54, an OAM device 56, a second multiplexer (MUX2) 58, and eight traffic handling SARs 60. Except for the ATM framer/deframer 48, each of the foregoing devices has its own Static RAM (SRAM). To maximize ATM cell throughput, the foregoing components are inter-connected using a UTOPIA interface with cell-level handshaking for speed considerations as opposed to byte-level handshaking).

The device driver also interacts with several high-level application tasks that run on top of the real-time operating system. These include conventional applications such as ATM OAM, ATM performance measurements, maintenance audits and automatic protection switching. In addition, the device driver interacts with Per-Call-Control (PCC) applications associated with the CGs 22 and the FS 26. These PCC applications are responsible for setting up calls through the circuit emulation board 40, as described in more detail below.

It will be appreciated that the board controller 46 also includes various other conventional hardware and software components (not shown) whose functions will be understood by persons skilled in the art. These include memory, timers, Programmable Interrupt Controllers (PICs), message queues, Interrupt Service Routines (ISRs), additional device drivers, and other elements. In addition, a Synchronous FIFO or mailbox interface 62 is used to communicate with a host processor 64 via a PCI or other (slower) bus interface.

The hardware devices controlled by the board controller's device driver cooperate to perform the various ATM/TDM conversion functions of the circuit emulation board 40. On its lower level (physical) side, the ATM framer/deframer 48 sends and receives OC-3c (or STS-1E) frames to and from the optical transceiver 44, which is responsible for bit timing, line coding and I/O control of the fiber optic physical medium. On its higher level (transport) side, the ATM framer/deframer 48 maintains a Universal Test and Operations PHY Interface for ATM (UTOPIA) interface with the CAM/RAM 50 and the MUX1 52. The ATM framer/deframer 48 sends delineated ATM cells to the CAM/RAM 50 and receives delineated ATM cells from the MUX1 52 over this interface. Relative to frames received from the optical transceiver 44, the ATM framer/deframer 48 performs conventional clock recovery, cell delineation, cell rate decoupling and Header Error Control (HEC) verification. Relative to ATM cells received from the MUX1 52, the ATM framer/deframer 48 performs HEC generation, transmission frame adaptation, and frame generation.

The CAM/RAM 50 receives delineated ATM cells from the ATM framer/deframer 48 and performs generic flow control and cell header translation/cell routing, as described in more detail below.

The MUX1 52 performs ATM cell multiplexing/demultiplexing in a 4:1/1:4 mode. As described in more detail below, for incoming ATM cells, the MUX1 52 reads the translated cell header generated by the CAM/RAM 50 and is capable of delivering the incoming cells to one of four tributaries. These tributaries can be respectfully assigned to AAL0 cells, AAL1/2 cells, AAL 3/4 cells, and AAL5 cells. For purposes of illustrating the invention, only two tributaries are implemented in the circuit emulation board 40. One is an AAL1 tributary carrying voice and AAL1 OAM traffic and the other is an AAL5 tributary carrying UNI signaling and AAL5 OAM traffic. Relative to the latter, the ability of the MUX1 52 to process AAL5 cells allows the circuit emulation board to terminate ATM AAL5 UNI signaling cells for a PVG 4 that integrates a CG 22. For PVGs that do not integrate a CG, the MUX1 52 is not required.

The signaling SAR 54 performs segmentation and reassembly of ATM AAL5 UNI signaling cells that are terminated at the circuit emulation board 40. It sends and receives AAL5 cells to and from the MUX1 52. It sends and receives assembled signaling messages via a PCI bus, using a Direct Memory Access (DMA) mechanism, to and from the host processor 64, which runs a UNI signaling stack 66 for BISDN (Broadband ISDN), an ISUP-MTP SS7 signaling stack 67 for ISDN, and a TCP/IP stack 68 for data networking. Like the MUX1 52, the SAR 54 is only needed on the circuit emulation board 40 when the latter operates in a PVG 4 that integrates a CG 22. The SAR 54 is not required for PVGs that do not have an integrated CG.

The OAM 56 performs OAM functions such as performance monitoring and fault management on selected AAL1 channels relative to various ATM segments and endpoints terminated by the circuit emulation board 40. These functions include the generation and receipt of VC level cell flow (F5) and VP level cell flow (F4) OAM cells. Unhandled F5 and F4 OAM AAL1 cells, as well as signaling hairpin cells, are also received by the OAM 56, but are not handled by that device. Instead, these cells are passed through the OAM 56 and delivered to the board controller 46 (via MUX2 58 and the traffic handling SARs 60) for software intervention. The OAM 56 also plays no part in handling AAL1 traffic cells, and instead passes such cells through to its neighbors, MUX1 52 and MUX2 58, depending on the cell flow direction.

The MUX2 58 performs ATM cell multiplexing/demultiplexing in an 8:1/1:8 mode. On one side, it sends and receives AAL1 traffic cells to and from the OAM 56. On its other side, it sends and receives such cells to and from each of the traffic handling SARs 60.

The traffic handling SARs 60 perform segmentation and reassembly for all AAL1 cells passing through the circuit emulation board 40. Each SAR 60 has eight (0–7) T1/E1 ports that are connected to a conventional TSI FPGA 70. Insofar as there are eight SARs 60, there are 64 T1/E1 pathways providing a throughput of 2048 DS0 channels. According to the UTOPIA level 1 specification, (8 bit mode at 35 MHz), the AAL1 bearer traffic runs at 90% capacity of the full OC-3 rate. The remainder of the bandwidth is reserved for OAM and hairpinning traffic. However, if the UTOPIA level 2 specification is used (16 bit mode at 50 MHz), the circuit emulation board can be scaled to DS0 line density to OC-12 (622 Mbps) such that 8K DS0 channels or 256 T1/E1 traffic pathways are supported.

1. CALL SETUP

In order to set up an ATM call channel, a PCC command originated by a CG 22 (or the FS 26) is received at the board controller 46 via the Host processor 64 and the sync FIFO 62. The board controller 46 issues a connect command to its device driver, which then sets up the ATM channel. The connect command includes a mapping between an AAL1/TDM port number and channel number, at one of the traffic handling SARs 60, and a corresponding ATM Virtual Channel Connection (VCC) for both the transmit and receive directions. Each VCC is identified by a unique VPI/VCI pair.

Note that a PCC application in a CG 22 or the FS 26 only needs to know about the pools of free TDM CICs (CIrcuit Channels) and ATM VCs (Virtual Channels) that are available at the circuit emulation board 40, representing circuits that are not busy. With that information, the call control application can send a PCC command with a free CIC-VC pair (through IPDC or the like) to the Host Processor 64. Although different AAL cell types are handled by their corresponding ATM devices on the circuit emulation board 40, the PCC applications do not need to be concerned with how to route cells to these devices. The PCC applications only see different sets of device driver APIs (Application Programming Interfaces) to be used for different types of cell traffic.

For example, to set up a TDM/ATM interworking AAL1 channel, a PCC application calls a corresponding set of API functions white specifying a TDM channel number and an ATM VPI/VCI pair respectively determined from the pools of free TDM CICs and free ATM VCs available at the circuit emulation board 40. Note that the VPI/VCI mappings on AAL1 Tx (Transmit) and Rx (Receive) can be independent. However, it is more practical to use the same ATM channel for both directions of routing through the ATM network. If the device driver returns with a "success" return value, the channel is up and ready for use.

For a AAL3/4/5 data channel, the device driver API functions are different from the ones used for AAL1 traffic. For example, a PCC application may request that an ATM channel with vpi/vci of 789/9876 to be mapped to an AAL5 VCCI (Virtual Channel Connection Identifier) of 15. This VCCI could be a data link layer channel allocated by a transport upper layer. Typical examples are TCP/IP for classical IP over ATM (RFC1483/1577), UNI signaling for B-ISDN and SS7 signaling over High-speed link for N-ISDN. Again, if the device driver returns with a "success" return value, the channel is up and ready for use.

Note that the device driver in the board controller 46 preferably also performs filtering and other front end processing, such as determining whether ATM or TDM channel numbers are being duplicated relative to channels that are still in use. As such, the device driver may return a "fail" return value to the calling PCC application.

After a channel request is received from a PCC application, the device driver in the board controller 46 coordinates the ATM cell handling devices of the circuit emulation board 40, namely, the CAM 50, the MUX1 52, the SAR 54 (if necessary), the OAM 56, MUX2 58 and the SARs 60, to set up the required path with a suitable QoS. To that end, and as described in more detail below, the device driver is programmed to establish a header translation scheme which guarantees that ATM cells received at the circuit emulation board 40 are routed to the correct ATM cell handling devices. An internal routing table (described in more detail below with reference to FIG. 4) is constructed based on the routing capabilities of the individual ATM devices.

For example, a PCC command to connect TDM port number 29/channel number 15 to ATM vpi/vci=54/3210 would require the device driver to set up a path on the circuit emulation board 40 by creating a translation table entry in the CAM/RAM 50 whereby an incoming cell of vpi/vci=54/3210 will be routed to DS0 channel number 15 of the 5-th port of the $3^{rd}$ SAR 60. For the reverse direction, PCM voice data on the channel will be AAL1 packetized and sent out on the VCC with vpi/vci=54/3210. To that end, and as a further part of call setup, the device driver in the board controller 46 sends the VPI/VCI mapping information provided by the PCC application to the traffic handling SARs 60, which store the information in their local SRAM for use during routing operations.

It will be appreciated that different routing tables may be used for different circuit emulation beards, depending on the set of ATM cell handling devices that are present on each board. However, the basic routing concept remains the same for all boards. The goal is to "compact or condense" a large 28-bit VPI/VCI address space into a 2048 TDM on-board address space.

It should be further noted that the translated header is only for "internal consumption" within the circuit emulation board 40 itself. The translated header can be thought of as an "alias" that allows the cell to get to its destination within the circuit emulation board. This header translation is totally transparent to the PCC applications, and the device driver of the board controller 46 is only involved in header translation during call setup. After a channel is set up, all voice/data transmission is performed exclusively in hardware to achieve real-time QoS of either CBR (Constant Bit Rate) or VBR (Variable Bit Rate) traffic.

2. TDM RECEIVE

Figure 5:
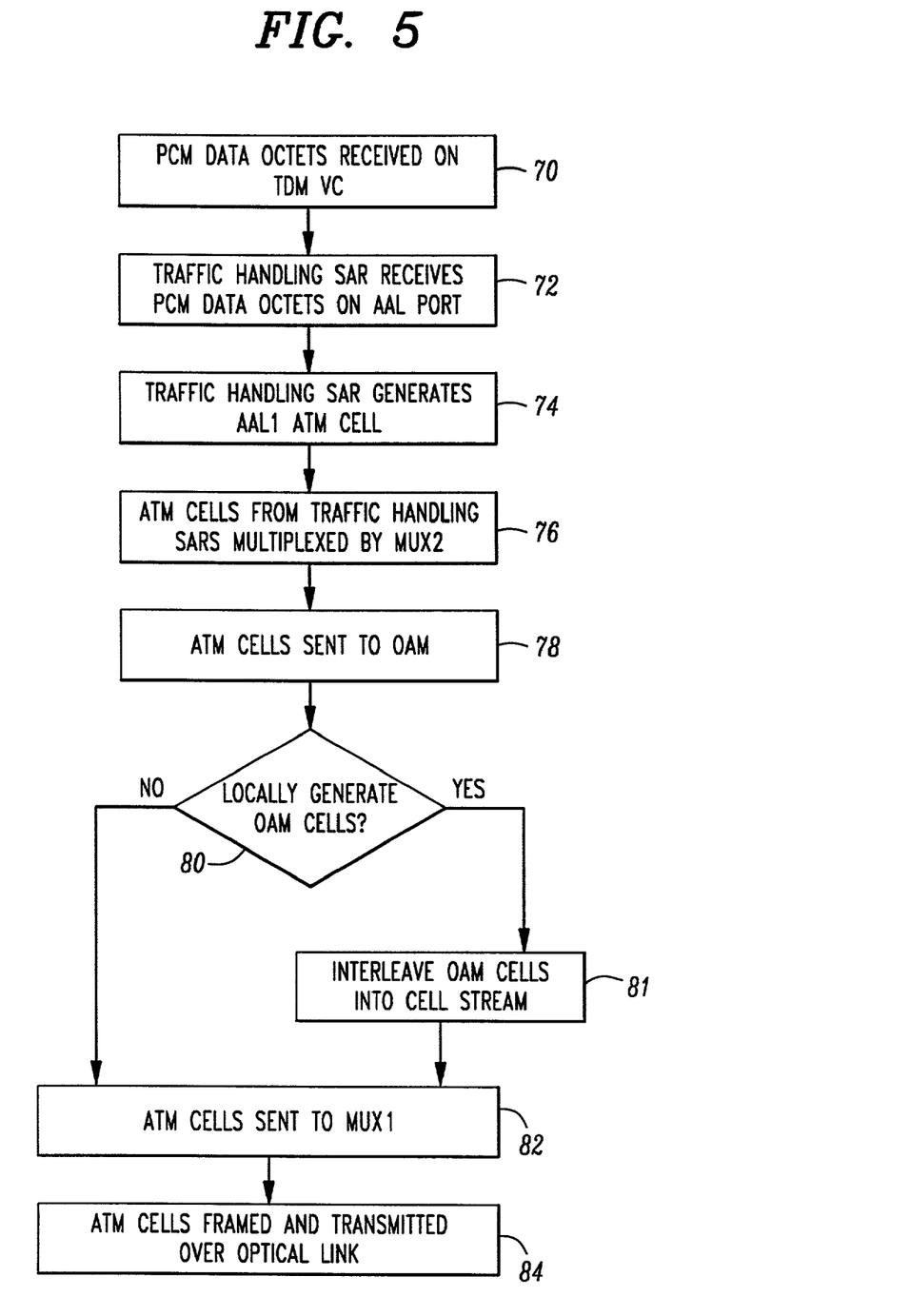
FIG. 5 is a flow diagram showing TDM traffic handling in accordance with the invention.

Processing performed by the circuit emulation board 40 relative to incoming TDM traffic will now be described with reference to the flow diagram of FIG. 5. A first TDM receive step 70 of FIG. 5 represents incoming PCM data octets being received on a TDM VC at the TDM side of the circuit emulation board 40. In step 72, the responsible traffic handling SAR 60 reads the PCM data octets from the appropriate AAL port as part of the 47 byte ATM data payload. In step 74, the traffic handling SAR 60, generates an appropriate AAL1 cell by adding the SAR-Protocol Data Unit (PDU) header for the CBR service traffic and an ATM cell header according to the VPI/VCI values specified by the board controller's device driver as part of call setup and stored in the SAR's local SRAM. The traffic handling SAR's local SRAM also stores the AAL1 Convergence-Sublayer (CS) header for the TDM VC.

In step 76, the AAL1 cell stream generated by the traffic handling SAR 60 is multiplexed by the MUX2 58 in its 8-to-1 mode. In step 78, the ATM cells are sent to the OAM 56. A check for locally generated OAM cells is made in step 80 and, if found, such cell are interleaved into the cell stream in step 81. In step 82, the ATM cells are then sent to MUX1 52 and then on to the ATM framer/deframer 48 in step 84 for framing and transmission by the optical transceiver 44.

3. ATM RECEIVE

As previously stated, the circuit emulation board 40 receives AAL1 voice traffic cells at its ATM side and converts them to TDM format for egress at its TDM side. The circuit emulation board 40 may also receive AAL5 data and OAM cells for local processing, handled AAL1 OAM cells, unhandled AAL1 OAM cells, and signaling hairpinning cells. In other implementations, the circuit emulation board 40 may be adapted to handle AAL0 raw cells, AAL 2 bearer cells and AAL 3/4 data cells.

By way of advance summary, as ATM cells are received from the ATM core network 6, their cell headers are translated by the CAM/RAM 50 according to a predetermined translation scheme. The ATM cells are then processed according to the content of their translated cell headers by MUX1 52, the OAM 56, MUX2 58 and the traffic handling SARs 60. This processing allows all ATM cells received by the circuit emulation board 40 to be handled according to their payload type.

Figure 3:
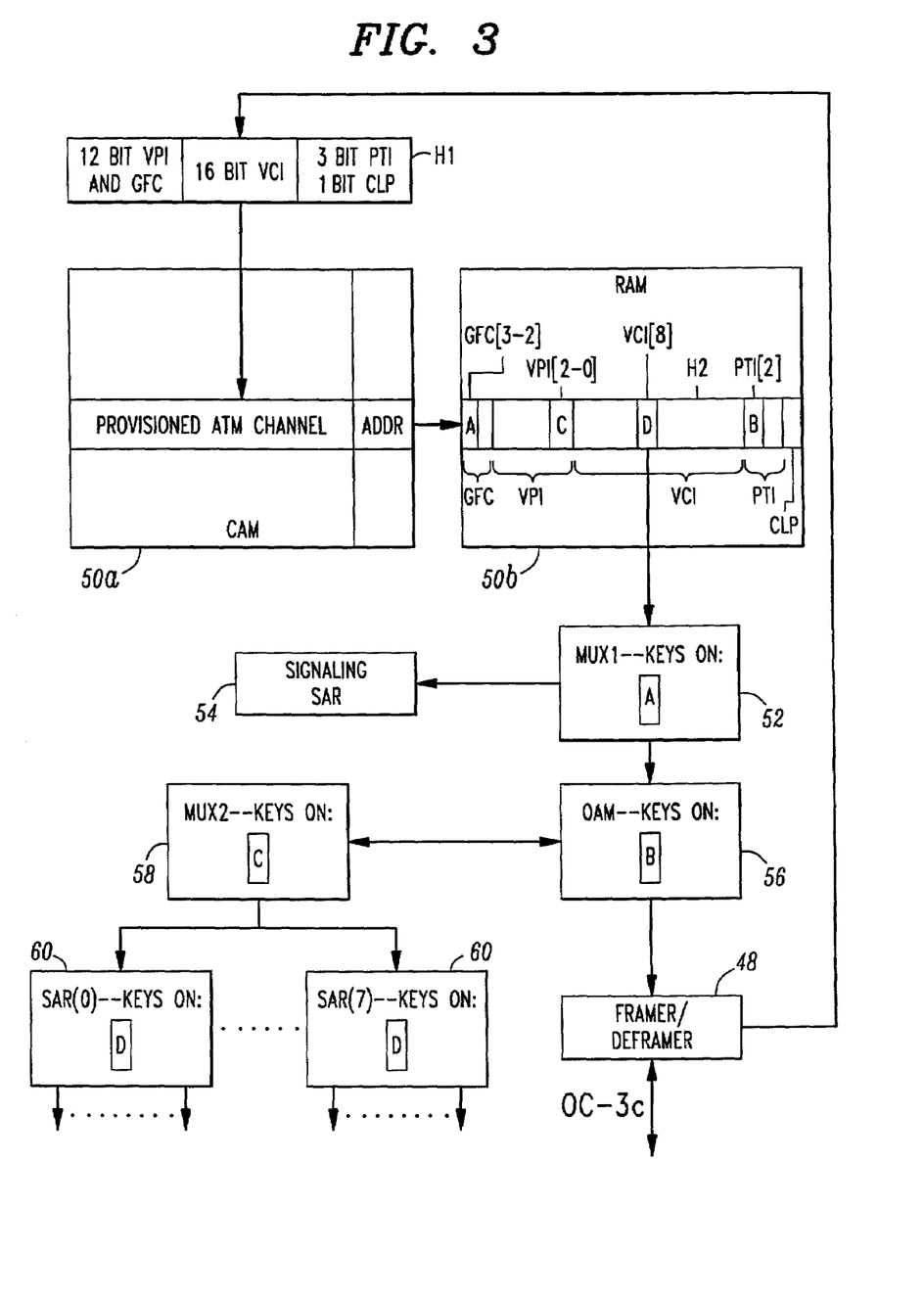
FIG. 3 is a functional block diagram showing a detailed view of a CAM and RAM lookup table implemented in the circuit emulation board of FIG. 2.
Figure 6A:
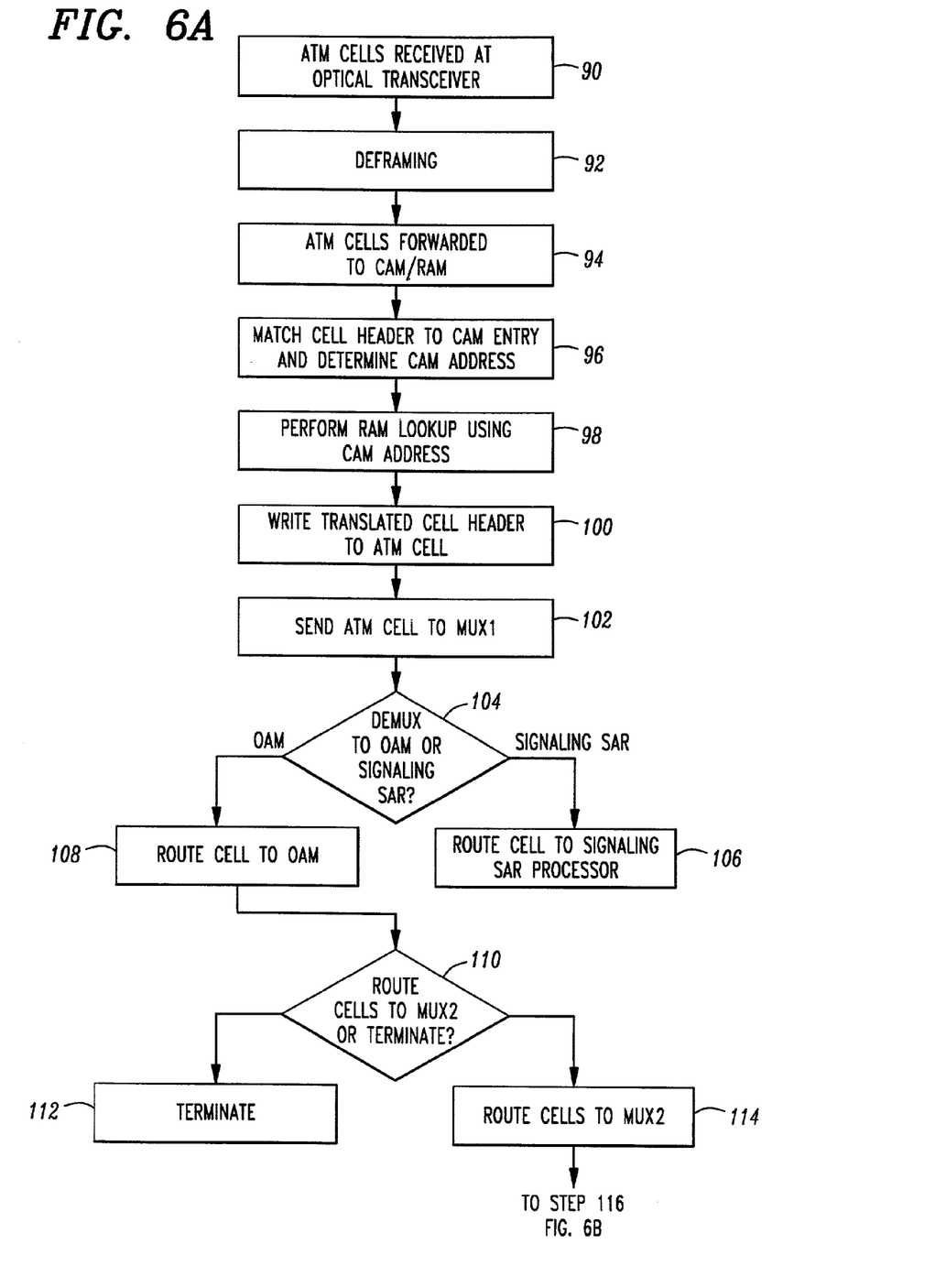
FIGS. 6A and 6B are parts of a flow diagram showing ATM cell handling in accordance with the invention.
Figure 6B:
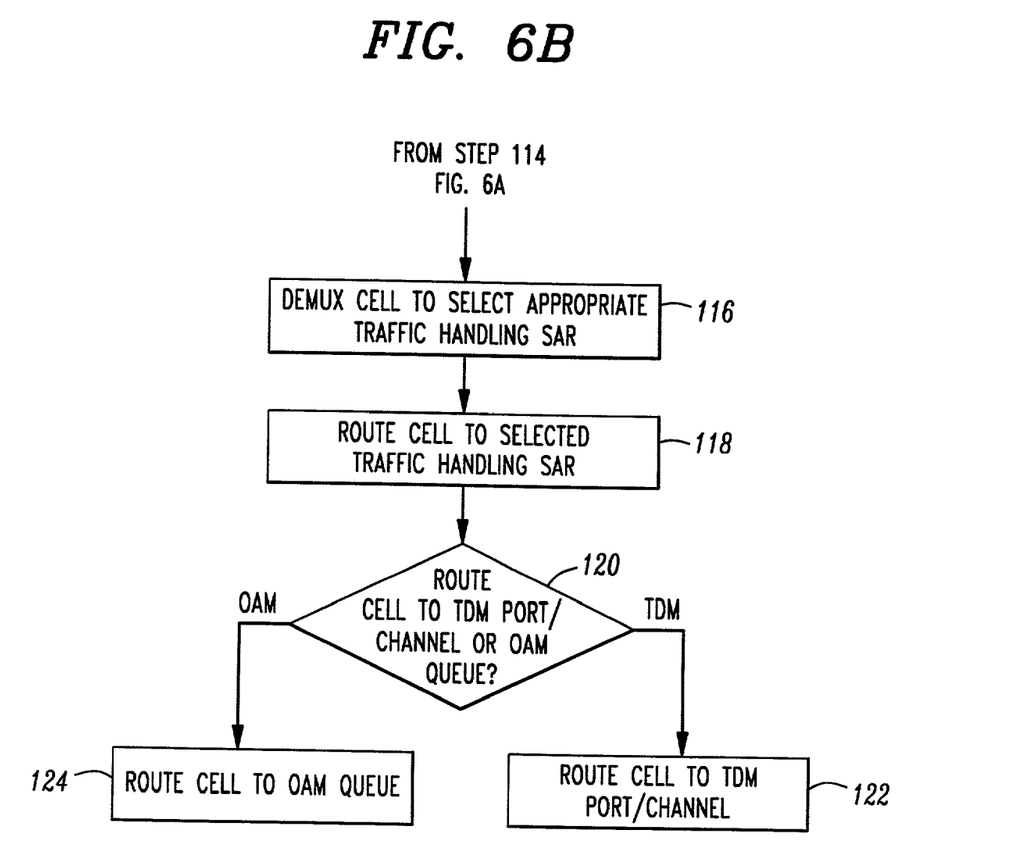

With additional reference now to the detailed block diagram of FIG. 3 and the flow diagram of FIG. 6, the ATM cells are received at the optical transceiver 44 as an OC-3c data stream in a first ATM receive step 90. After conventional clock recovery, the usual physical layer deframing is performed at the framer/deframer 48 in step 92. In step 94, the ATM cells are forwarded to the CAM/AM 50 for cell header translation and cell routing. FIG. 3 shows one such cell, having a cell header labeled "H1," as it arrives at the CAM/RAM 50. FIG. 3 also shows the separate CAM and RAM components of the CAM/RAM 50. These components shall be hereinafter referred to as CAM 50a and RAM 50b. Translation of the incoming cell header "H1" includes mapping the untranslated cell header to a translated cell header, labeled "H2" in FIG. 3. This mapping is performed by the CAM/RAM 50 using the VPI/VCI channel information provisioned during call connection setup.

Persons skilled in the art will appreciate that a CAM permits the rapid lockup of stored data using the data itself to find a storage address, rather than a storage address to find the data. CAM/RAM combinations have been used successfully in ATM switches to rapidly rewrite new VPI/VCI cell header information to ATM cells as they are passed from one VC link segment to another along a VCC. In particular, when an incoming cell arrives at an ATM switch, a CAM lookup is performed using the cell header VPI/VCI information. When a match occurs, the address associated with the provisioned VPI/VCI information is used to access a RAM containing the VPI/VCI cell header information forte next hop. This new information is written to the cell header and the cell is sent along to the next ATM switch.

The same principal is used in the CAM/RAM 50 of the circuit emulation board 40. When an ATM channel is assigned during call setup, cell header information for that channel is written to the CAM 50a and stored at a CAM address. When the incoming ATM cell with the cell header "H1" is received at the CAM 50a in step 94, the cell header is used to perform a CAM lookup in step 96. When a match is found, the associated CAM address value is used to perform a lookup in the RAM 50b in step 98. The translated cell header "H2" will be provisioned at this address (as part of call setup) and is written to the cell as the new cell header in step 100.

Although various translation schemes may be used to implement the invention, the circuit emulation board 40 implements a four-element cell header mapping strategy in which four bit fields of the untranslated cell header "H1" are rewritten with routing information for use by the downstream cell handling components of the circuit emulation board. In particular, and with additional reference now to FIG. 4, a first bit field "A," representing Generic Flow Control (GFC) bits 3 and 2 of the untranslated cell header H1, is rewritten with values of either "0" or "1." This information is used by MUX1 52 to route AAL5 cells to the signaling SAP. 54 (if GEC bit 2 contains a "1") and to route AAL1 cells to the OAM 56 (if GFC bit 2 contains a "0").

Figure 4:
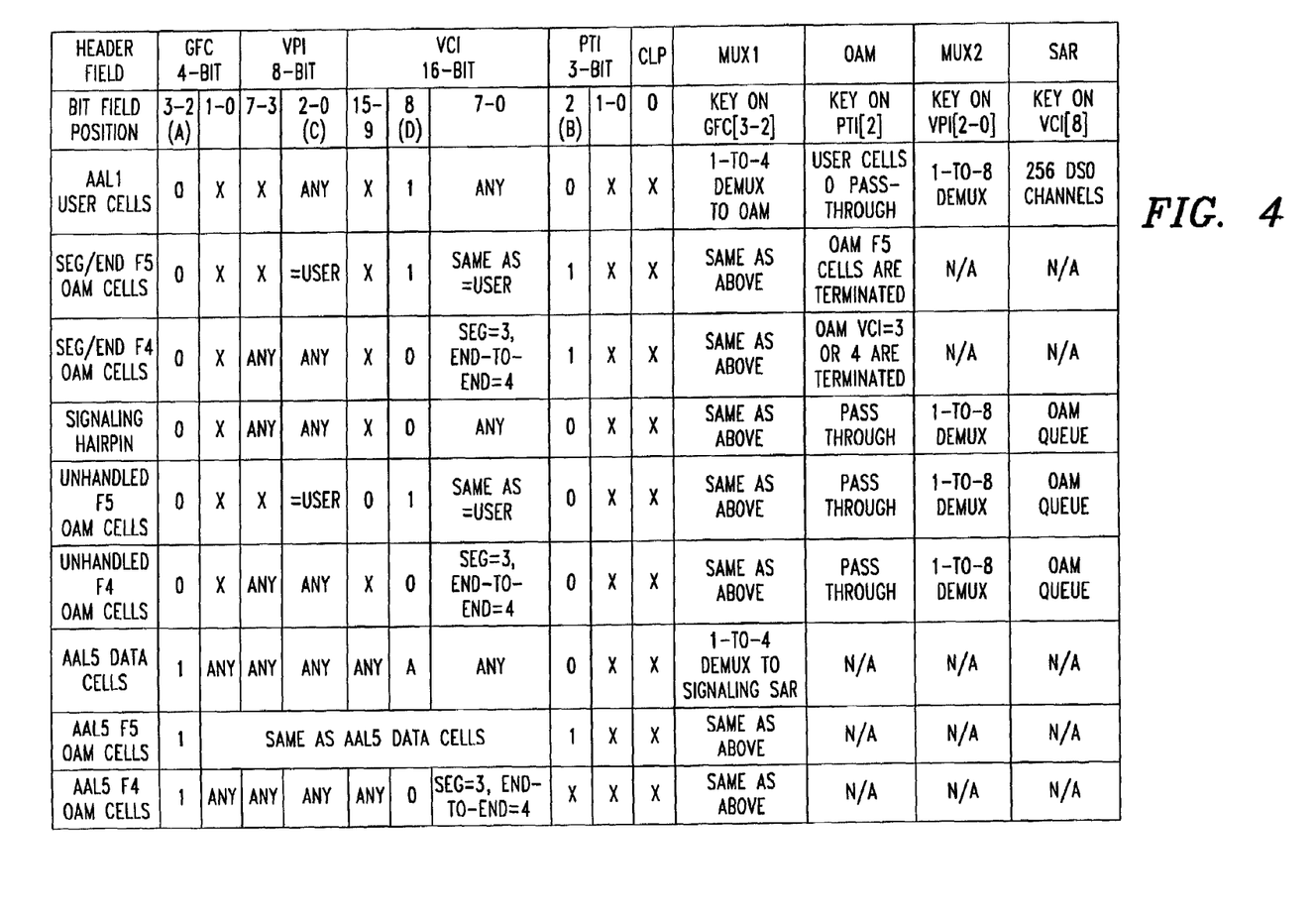
FIG. 4 is a table showing an exemplary CAM address translation scheme in accordance with the invention.

Note that GFC bit 3 is not actually used by the circuit emulation board 40 in the illustrated embodiment in which MUX1 52 acts as a 1:2 demultiplexer for separating AAL1 and AAL5 traffic. However, by using GEC bit 3, 1:4 demultiplexing could be implemented such that additional adaptation layer cell types, such as AAL0 and AAL 3/4 could be processed.

A second bit field "B," representing Payload Type Identifier (PTI) bit 2 of the untranslated cell header H1, is rewritten with a value of either "0" or "1." This information is used by OAM 56 to terminate handled OAM cells (if PTI bit 2 is a "1") and to pass through all other cells (if PTI bit 2 is a "0").

A third bit field "C," representing VPI bits 2-0 of the untranslated cell header H1, is rewritten with values of either "0" or "1." This information, which can provide eight different values, is used by MUX2 58 as a traffic handling SAR identifier as it performs 1:8 demultiplexing. It will be seen that the "C" column for VPI bits 2-0 in the table of FIG. 4 has some entries that read "any" and other entries that read "=user." The "any" entry designates a translated value and the "=user" entry designates a translated F5 VPI/VCI that is carried over from the corresponding translated "any" value on a user channel. In the table of FIG. 4, the "any" entry for AAL1 cells appears in the "C" column. The "any" value can be conveniently assigned in a round robin or circular fashion initially so that sequential PCC requests are evenly distributed among different ports of the SARs 60. But as calls are set up and torn down randomly, the "any" values will end up being assigned from a free pool of size 2048. It should be noted that other columns of the table of FIG. 4 have a third entry that reads "x." The "x" entry is a "don't care" designation because these header values will not be examined (i.e., they will be ignored) by the various ATM devices chosen for the circuit emulation board 40 and hence can be set to 0 in the CAM look-up table 50a. Note that the CAM look-up table size is determined by the total number of supported channels forte various AAL types handled by the circuit emulation board 40.

A fourth bit field "D," representing VCI bit 8 of the untranslated cell header H1, is rewritten with a value of either "0" or "1." This information is used by the traffic handling SARs 60 to handle OAM cells that should be forwarded to an unhandled OAM cell queue (not shown) maintained by the host processor 64. If the value is a "0" the cell is sent to the OAM queue. If the value is a "1" the cell is sent to the appropriate output port and channel (based on the remaining VCI bits VCI [7-0]).

Having now described an exemplary cell translation and routing scheme, it will be seen in FIG. 3 that header-translated cells leave the CAM/RAM 50 and are forwarded to MUX1 52 in step 102. In step 104, the "A" field of the translated cell header is checked and a decision is made whether to send the cell to the signaling SAR 54 or the OAM 56. If the decision is to route to the signaling SAR 54, the cell is sent there in step 106. If the decision is to route to the OAM 56 the cell is sent there and processed in step 108.

In step 110, the "B" field of the translated cell header is checked and a decision is made whether to pass the cell through to MUX2 58 or terminate the cell as a handled OAM cell. If the decision is to terminate the cell, it is processed accordingly in step 112. If the decision is to pass the cell through to MUX2 58, it is routed there in step 114.

In step 116, the "C" field of the translated cell header is checked and one of the traffic handling SAR's 60 is selected to receive the cell. In step 118, the cell is routed to the selected traffic handling SAR.

In step 120, the "D" field of the translated cell header is checked and a decision is made whether to route the cell to an output port and channel for TDM transmission or place the cell in the host processor's unhandled OAM cell queue. If TDM routing is indicated, the cell is forwarded to appropriate port and channel in step 122. If OAM processing is indicated, it means the cell is an unhandled OAM cell or a hairpinning cell. The traffic handling SAR 60 generates an interrupt to the board controller 46, and the driver causes the cell to be copied to a buffer area, where it can be concatenated with similar cells from other traffic handling SARs and delivered to the host processor's unhandled OAM cell queue. Note that the translated ATM headers of signaling hairpinning cells are replaced by vpi/vci=0/5 and sent back to the ATM network through the OAM 56 by the device driver and vice versa.

Accordingly, novel system and method have been disclosed for performing high capacity conversion of ATM formatted cells received from an ATM packet network to a TDM format for delivery to a circuit switched network. The cells may include raw AAL0 cells, AAL 1/2 bearer cells, AAL 3/4 data cells and AAL5 signaling cells. While various embodiments of the invention have been described, it should be apparent that many variations and alternative embodiments could be implemented in accordance with the invention. For example, instead of sending hairpinning cells through the traffic handling SARs 60 for placement on an unhandled OAM cell queue, they could be routed to the signaling SAR 54 for further processing by an upper layer protocol stack, which resides in the host processor 64 as shown in FIG. 2. It is understood, therefore, that the invention is not to be in any way limited except in accordance with the spirit of the appended claims and their equivalents.

What is claimed is:

1. A method for performing high capacity conversion of Asynchronous Transfer Mode (ATM) formatted cells received from an ATM packet network to a Time Division Multiplexed (TDM) format for delivery to a circuit switched network, said ATM cells including one or more of ATM Adaptation Layer (AAL) 1/2 bearer cells, AAL 3/4 data cells, AAL5 signaling cells and raw AAL0 cells, comprising the steps of:
   receiving a stream of ATM cells from said ATM packet network;
   translating cell headers of said ATM cells according to a predetermined translation scheme based on cell payload type, said translated cell headers being applied to said ATM cells as ATM cell headers and containing fields that determine how said ATM cells will be processed;
   forwarding said ATM cells with said translated ATM cell headers applied thereto; and
   processing said ATM cells according to said translated cell headers such that said ATM cells are handled according to their payload type.

2. A method in accordance with claim 1 wherein said receiving step includes receiving said ATM cells at an optical fiber interface.

3. A method in accordance with claim 1 wherein said translating step includes mapping untranslated cell headers of said ATM cells to said translated cell headers.

4. A method in accordance with claim 3 wherein said mapping step includes using a content addressable memory table to match said untranslated cell headers to said translated cell headers.

5. A method in accordance with claim 4 wherein said matching step includes performing lookups in said content addressable memory table based on said untranslated cell headers to identify corresponding address values.

6. A method in accordance with claim 5 wherein said matching step further includes using said address values to locate corresponding translated cell headers in a lockup table.

7. A method in accordance with claim 6 wherein said mapping step further includes applying said translated cell headers to said ATM cells and forwarding said cells for cell processing.

8. A method in accordance with claim 1 wherein said cell processing includes using plural cell processing devices to perform different kinds of cell processing according to said translated cell headers.

9. A method in accordance with claim 8 wherein said cell processing includes processing Operations And Maintenance (OAM) cells according to a first cell processing strategy and processing bearer and data traffic cells according to a second processing strategy.

10. A method in accordance with claim 9 wherein said cell processing further includes processing signaling cells according to a third cell processing strategy.

11. A Packet Voice Gateway system adapted to perform high capacity conversion of Asynchronous Transfer Mode (ATM) formatted cells received from an ATM packet network to a Time Division Multiplexed (TDM) format for delivery to a circuit switched network, said ATM cells including one or more of ATM Adaptation Layer (AAL) 1/2 bearer cells, AAL 3/4 data cells, AAL5 signaling cells and raw AAL0 cells, comprising:
   an interface configured to receive a stream of ATM cells from said ATM packet network;
   a translator configured to translate cell headers of said ATM cells according to a predetermined translation scheme based on cell payload type, said translated cell headers being applied to said ATM cells as ATM cell headers and containing fields that determine how said ATM cells will be processed;
   said translator being further configured to forward said ATM cells with said translated ATM cell headers applied thereto; and
   one more cell processors configured to process said ATM cells according to said translated cell headers such that said ATM cells are handled according to their payload type.

12. A system in accordance with claim 11 wherein said interface includes an optical fiber interface.

13. A system in accordance with claim 11 wherein said translator includes a mapper for mapping untranslated cell headers of said ATM cells to said translated cell headers.

14. A system in accordance with claim 13 wherein said mapper includes a content addressable memory table to match said untranslated cell headers to said translated cell headers.

15. A system in accordance with claim 14 wherein said mapper is adapted to perform lookups in said content addressable memory table based on said untranslated cell headers to identify corresponding address values.

16. A system in accordance with claim 15 wherein said mapper further includes a lookup table containing translated cell headers and which is indexed by said address values identified in said content addressable memory table.

17. A system in accordance with claim 16 wherein said mapper further includes a cell header replacement circuit adapted to apply said translated cell headers to said ATM cells and forward said cells for cell processing.

18. A system in accordance with claim 11 wherein said cell processing includes using plural cell processing devices to perform different kinds of cell processing according to said translated cell headers.

19. A system in accordance with claim 18 wherein said cell processors include an Operations And Maintenance (OAM) processor adapted to process OAM cells according to a first cell processing strategy and a Segmentation And Reasssembly (SAR) processor adapted to process bearer and data traffic cells according to a second processing strategy.

20. A system in accordance with claim 19 wherein said cell processors further include a signaling SAR processor adapted to process signaling cells according to a third cell processing strategy.

21. A Packet Voice Gateway system adapted to perform high capacity conversion of Asynchronous Transfer Mode (ATM) formatted cells received from an ATM packet network to a Time Division Multiplexed (TDM) format for delivery to a circuit switched network, said ATM cells including one or more of ATM Adaptation Layer (AAL) 1/2 bearer cells, AAL 3/4 data cells, AAL5 signaling cells and raw AAL0 cells, comprising:
- an optical transceiver adapted to receive a stream of synchronous optical network encoded ATM cells from said ATM packet network;
- a synchronous optical network framer/deframer;
- an ATM cell header translator/cell router comprising a Content Addressable Memory (CAM) and a Random Access Memory (RAM) lookup table adapted to translate cell headers of said ATM cells according to a predetermined translation scheme, said CAM being provisioned with plural memory locations each containing ATM channel information for an ATM cell being received at said transceiver and being further associated with an address value, each said address value of said CAM representing a memory location in said RAM lookup table containing a translated cell header, said cell header translator/cell router being further adapted to replace untranslated cell headers of said ATM cells received at said optical transceiver with translated cell headers determined from RAM lookup table, and to route said translated ATM cells for cell processing;
- an Operations And Maintenance (OAM) cell processor adapted to process first OAM ATM cells having first translated cell header values;
- a board processor adapted to process second OAM ATM cells having second translated cell header values;
- a multiplexer/demultiplexer adapted to process AAL 1/2 and AAL 3/4 ATM cells and to route said cells to output ports according to third translated cell header values;
- plural Segmentation And Reassembly (SAR) processors, each SAR processor being adapted to receive AAL 1/2 and AAL 3/4 ATM cells received from one of said multiplexer/demultiplexer output ports, to reassemble said cells into a format suitable for Time Division Multiplexing (TDM) transmission, and to route said reassembled cells to output ports according to fourth translated cell header values;
- a Time Slot Interchange (TSI) interface adapted to receive said reassembled cells from said SAR processor output ports and to format them for TDM transmission; and
- a TDM bus interface adapted to transmit said reassembled cells in TDM format to said circuit switched network.

22. A system in accordance with claim 21 wherein said first OAM ATM cells includes Seg. and End F4 (VP level cell flow) OAM cells and Seg. and End F5 (VC level) OAM cells.

23. A system in accordance with claim 21 wherein said second OAM ATM cells include unhandled F4 OAM cells and unhandled F5 OAM cells.

24. A system in accordance with claim 21 wherein said second OAM ATM cells include signaling cells received on a hairpinning channel from a Control Gateway via said ATM network.

25. A system in accordance 21 further including a second multiplexer/demultiplexer located between said cell header translator/cell router and said OAM processor, and said second multiplexer/demultiplexer being adapted to process AAL 5 cells having fifth translated cell header values, an AAL 5 SAR adapted to receive said AAL 5 cells from said second multiplexer/demultiplexer and forward them to an AAL 5 signaling stack.

* * * * *